US00RE48820E

(19) United States
(12) Reissued Patent
Lee et al.

(10) Patent Number: US RE48,820 E
(45) Date of Reissued Patent: *Nov. 16, 2021

(54) METHOD FOR PHYSICAL CONTROL FORMAT INDICATOR CHANNEL MAPPING

(71) Applicant: Microsoft Technology Licensing, LLC, Redmond, WA (US)

(72) Inventors: Jung Hoon Lee, Anyang-si (KR); Joon Kui Ahn, Anyang-si (KR)

(73) Assignee: Microsoft Technology Licensing, LLC, Redmond, WA (US)

( * ) Notice: This patent is subject to a terminal disclaimer.

(21) Appl. No.: 15/483,510

(22) Filed: Apr. 10, 2017

Related U.S. Patent Documents

Reissue of:
(64) Patent No.: 9,179,463
Issued: Nov. 3, 2015
Appl. No.: 13/957,347
Filed: Aug. 1, 2013

U.S. Applications:
(60) Continuation of application No. 15/285,346, filed on Oct. 4, 2016, now Pat. No. Re. 47,764, which is a
(Continued)

(30) Foreign Application Priority Data

Sep. 2, 2008 (KR) ..... 10-2008-0086368

(51) Int. Cl.
*H04L 5/00* (2006.01)
*H04W 72/04* (2009.01)

(52) U.S. Cl.
CPC ..... *H04L 5/0083* (2013.01); *H04L 5/0007* (2013.01); *H04L 5/0041* (2013.01);
(Continued)

(58) Field of Classification Search
CPC ... H04L 5/0094; H04L 5/0083; H04L 5/0044; H04L 5/0007; H04L 5/0041; H04W 72/0453
See application file for complete search history.

(56) References Cited

U.S. PATENT DOCUMENTS 6,300,864 B1 10/2001 Willey
6,385,457 B1 5/2002 Dam et al.
(Continued)

FOREIGN PATENT DOCUMENTS

CN 1568587 1/2005
CN 1568587 A 1/2005
(Continued)

OTHER PUBLICATIONS

"Final Office Action Issued in U.S. Appl. No. 15/285,346", dated Mar. 28, 2019, 13 Pages.
(Continued)

*Primary Examiner* — Charles R Craver
(74) *Attorney, Agent, or Firm* — Thomas M. Hardman; Ray Quinney & Nebeker; Bo Niu

(57) ABSTRACT

A method of mapping symbols of a physical control format indicator channel (PCFICH) is described. A start position of a resource element to map the symbols for the PCFICH is determined by flooring a value, obtained by multiplying the number of resource blocks by a variable proportional to a symbol index for the PCFICH and then dividing the multiplied result by 2, wherein the resource blocks are transmitted in downlink. The symbols are mapped in the start position. Therefore, a problem of wasting resource elements or not being able to implement mapping can be solved by applying a simple mapping rule while mapping symbols of the PCFICH.

8 Claims, 7 Drawing Sheets

Related U.S. Application Data division of application No. 15/264,264, filed on Sep. 13, 2016, now Pat. No. Re. 47,190, which is an application for the reissue of Pat. No. 9,179,463, which is a continuation of application No. 12/960, 339, filed on Dec. 3, 2010, now Pat. No. 8,526,414, which is a continuation of application No. 12/331, 464, filed on Dec. 10, 2008, now Pat. No. 7,869,415.

(60) Provisional application No. 61/013,281, filed on Dec. 12, 2007.

(52) U.S. Cl.
CPC ..... *H04L 5/0044* (2013.01); *H04L 5/0094* (2013.01); *H04W 72/0453* (2013.01)

(56) References Cited

U.S. PATENT DOCUMENTS

| | | | | |
|---|---|---|---|---|
| 8,254,245 | B2 * | 8/2012 | Kim | H04L 5/0053 370/207 |
| 8,428,164 | B2 * | 4/2013 | Molnar | H04W 72/0406 375/260 |
| 8,831,119 | B2 | 9/2014 | Kang et al. | |
| 9,065,583 | B2 | 6/2015 | Damnjanovic et al. | |
| 9,319,183 | B2 | 4/2016 | Luo et al. | |
| 10,206,200 | B2 | 2/2019 | Kusashima et al. | |
| 2003/0036403 | A1 | 2/2003 | Shiu et al. | |
| 2005/0020260 | A1 | 1/2005 | Jeong et al. | |
| 2005/0120097 | A1 | 6/2005 | Walton et al. | |
| 2007/0206559 | A1 * | 9/2007 | Cho et al. | 370/344 |
| 2009/0116573 | A1 | 5/2009 | Gaal et al. | |
| 2009/0147743 | A1 * | 6/2009 | Parkvall et al. | 370/329 |
| 2009/0259909 | A1 | 10/2009 | Luo | |
| 2009/0290597 | A1 | 11/2009 | Baumgartner et al. | |
| 2010/0189038 | A1 | 7/2010 | Chen et al. | |
| 2012/0243500 | A1 | 9/2012 | Chandrasekhar et al. | |
| 2019/0149365 | A1 | 5/2019 | Chatterjee et al. | |

FOREIGN PATENT DOCUMENTS

| | | | |
|---|---|---|---|
| EP | 1819118 | | 8/2007 |
| EP | 1819118 | A2 | 8/2007 |
| JP | 2010-541319 | | 12/2010 |
| JP | 2010-541319 | A | 12/2010 |
| RU | 2251797 | | 5/2005 |
| WO | 2005099290 | A1 | 10/2005 |
| WO | 2009/041879 | | 4/2009 |
| WO | 2009/041879 | A1 | 4/2009 |

OTHER PUBLICATIONS

"Notice of Allowance Issued in U.S. Appl. No. 15/285,346", dated Aug. 2, 2019, 15 Pages.

3GPP TSG RAN WG1 Meeting #51, Nov. 9, 2007, Samsung PHICH/PDCCG to RE mapping, R1-074773.

Nokia et al., "Control Channel to RE Mapping," 3GPP TSG RAN WG1 Meeting #50bis, Shanghai, China, R1-074318, Dec. 10, 2007

Dorot et al., "Symbol is an element of sign set allowable of a computing system, which can be coded, input into a computer and displayed on a display screen. Symbols are letters, numerals and etc.," Explanatory Dictionary of Modern Computer Lexis, Saint-Petersburg, BHV-Petersburg, 2004, pp. 433-L1.

A.B. Borkovsky, "Mapping is representation, matching; conversion," English-Russian Dictionary Programming and Informatics, Moscow International School of Translator, 1992, pp. 161-L2.

Samsung,"PHICH/PDCCH to RE mapping," 3GPP TSG RAN WG1 Meeting #51, Jueju, Korea, Nov. 5-9, 2007, R1-074773, XP50108242.

3rd Generation Partnership Project: "Technical Specification Group Radio Access Network; Evolved Universal Terrestrial Radio Access (E-UTRA); Physcial Channels and Modulation (Release 8)," 3GPP TS 36.211, V8.1.0, Nov. 2008, XP050377533.

U.S. Appl. No. 15/285,346, filed Oct. 4, 2016.

U.S. Appl. No. 15/264,264, filed Sep. 13, 2016.

U.S. Appl. No. 13/957,347, filed Aug. 1, 2013.

U.S. Appl. No. 12/960,339, filed Dec. 3, 2010.

U.S. Appl. No. 12/331,464, filed Dec. 10, 2008.

3 GPP TSG RAN WG1 Meeting #51, (Nov. 9, 2007), Samsung PCFICH Mapping for One Transmitter Antenna, R1-074769.

Samsung: "CCFI to RE mapping for multiple TX antennas", 3GPP TSG RAN WG1 Meeting #51, Jeju, Korea, Nov. 5-9, 2007, R1-074770.

LG Electronics: "Correction on the PCFICH to RE mapping", 3GPP TSG RAN WG1 #51bis, Sevilla, Spain, Jan. 14-18, 2008, R1-080369, XP50108888.

Samsung: PCFICH Mapping for One Transmitter Antenna:, 3GPP TSG RAN WG1 Meeting #51, Jeju, Korea, Nov. 5-9, 2007, R1-074769, XP50108238.

* cited by examiner

METHOD FOR PHYSICAL CONTROL FORMAT INDICATOR CHANNEL MAPPING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of, and claims the benefit of, U.S. application Ser. No. 12/960,339, filed Dec. 3, 2010, which is a continuation of U.S. application Ser. No. 12/331,464, filed Dec. 10, 2008 (now U.S. Pat. No. 7,869,415), and claims priority to U.S. Provisional Application No. 61/013,281, filed Dec. 12, 2007 and Korean Application No. 10-2008-0086368, filed in the Republic of Korea on Sep. 2, 2008, and each of the above-identified applications are incorporated by reference in their entirety as if fully set forth herein.] *Applicant notes that more than one reissue has been filed, and the reissue applications are application Ser. Nos. 15/483,510 (the present application), 15/285,346, and 15/264,264; specifically, the present application, application Ser. No. 15/483,510, filed Apr. 10, 2017, is a continuation reissue of U.S. patent application Ser. No. 13/957,347, filed Aug. 1, 2013, and issued as U.S. Pat. No. 9,179,463 on Nov. 3, 2015; application Ser. No. 15/285,346, filed Oct. 4, 2016, and issued as U.S. Pat. No. RE47,764 on Dec. 10, 2019, is a divisional reissue of U.S. Pat. No. 9,179,463; application Ser. No. 15/264,264, filed Sep. 13, 2016, and issued as U.S. Pat. No. RE47,190 on Jan. 1, 2019, is a reissue of U.S. Pat. No. 9,179,463; the present application is a continuation reissue application of U.S. patent application Ser. No. 15/285,346, which is a divisional reissue application of U.S. application Ser. No. 15/264,264, which is a reissue of U.S. patent application Ser. No. 13/957,347, which is a continuation of, and claims the benefit of, U.S. patent application Ser. No. 12/960,339, filed Dec. 3, 2010, which issued as U.S. Pat. No. 8,526,414 on Sep. 3, 2013, which is a continuation of U.S. patent application Ser. No. 12/331,464, filed Dec. 10, 2008, which issued as U.S. Pat. No. 7,869,415 on Jan. 11, 2011, and claims priority to U.S. Provisional Application No. 61/1013,281, filed Dec. 12, 2007, and Korean Application No. 10-2008-0086368, filed in the Republic of Korea on Sep. 2, 2008, and each of the above identified applications are incorporated by reference in their entirety as if fully set forth herein.*

TECHNICAL FIELD

The present invention relates to a mapping method for frequency and orthogonal frequency division multiplexing (OFDM) symbol regions of a signal transmitted in downlink in a cellular OFDM wireless packet communication system, and more particularly, to a mapping method which is capable of solving a problem of wasting resource elements or not being able to implement mapping by applying a simple mapping rule while mapping symbols of a physical control format indicator channel (PCFICH).

BACKGROUND

When transmitting data through downlink of an OFDM wireless packet communication system, if each user equipment is informed of how many OFDM symbols are used to transmit a control channel, the user equipment has many advantages in using information of the control channel. Especially, a 3GPP LTE system defines a channel notifying the number of OFDM symbols used for the control channel as a physical control format indicator channel (PCFICH).

More specifically, in the 3GPP LTE system, the PCFICH is expressed as 2 bits indicating three states according to whether the number of OFDM symbols used to transmit the control channel is 1, 2, or 3. The 2 bits are increased to bits through channel coding and then expressed as 16 quadrature phase shift keying (QPSK) symbols through QPSK modulation. The PCFICH is always transmitted only through the first OFDM symbol of a subframe and a mapping method in a frequency region for transmission is as follows.

y(0), . . . , y(3) are mapped to resource elements starting with a position of k=k.sub.0, y(4), . . . , y(7) are mapped to resource elements starting with a position of k=k.sub.0+.left brkt-bot.N.sub.RB.sup.DLN.sub.sc.sup.RB/4.right brkt-bot., y(8), . . . , y(11) are mapped to resource elements starting with a position of k=k.sub.0+.left brkt-bot.2N.sub.RB.sup.DLN.sub.sc.sup.RB/4.right brkt-bot., and y(12), . . . , y(15) are mapped to resource elements starting with a position of k=k.sub.0+.left brkt-bot.3N.sub.RB.sup.DLN.sub.sc.sup.RB/4.right brkt-bot.. Here, a value k.sub.0 for shifting a starting point is k.sub.0=(N.sub.sc.sup.RB/2)(N.sub.ID.sup.cell mod 2N.sub.RB.sup.DL).

The above additions include a modular operation of N.sub.RB.sup.DLN.sub.sc.sup.RB, and N.sub.ID.sup.cell denotes a physical layer cell identification (ID).

In the above mapping rule, y(0), . . . , y(15) denote 16 QPSK symbols, N.sub.RB.sup.DL denotes the number of resource blocks transmitted in downlink, and N.sub.sc.sup.RB denotes the number of resource elements per resource block. k.sup.0 is determined according to the cell ID N.sub.ID.sup.cell which varies with each cell. Starting with k.sup.0, the symbols are dispersed in four frequency regions comprised of 4 adjacent resource elements which are not used for transmission of a reference signal (RS) to obtain a frequency diversity gain over all downlink frequency bands, and then transmitted. The reason why the adjacent resource elements which are not used for transmission of the reference signal are used is that since other control channels are constructed with a resource element group (REG) comprised of 4 adjacent resource elements which are not used for transmission of the REFERENCE SIGNAL, multiplexing of a PCFICH with other control channels can be efficiently performed using the same mapping method.

However, when mapping symbols for the PCFICH according to the above-described mapping method, there may be the following disadvantages.

First, if and N.sub.sc.sup.RB is 12 in a general subframe structure of a 3GPP LTE system, the second and fourth frequency regions among 4 frequency regions are mapped over 2 REGs when N.sub.RB.sup.DL is an odd number.

FIG. 1 illustrates a conventional mapping method in which 4 symbols are mapped to 2 REGs.

As illustrated in FIG. 1, if N.sub.RB.sup.DL is an even number, 4 frequency regions for transmission of a PCFICH are identical to units of an REG for transmission of other control channels. However, if N.sub.RB.sup.DL is an odd number, the second and fourth frequency regions are mapped over 2 REGs. In this case, since an REG is comprised of 4 adjacent resource elements which are not used for transmission of a reference signal, resource elements remaining at both sides of the 4 adjacent resource elements can not be used for transmission of a control channel, thereby wasting resources.

Second, the above-described mapping rule has a region in which mapping can not be implemented.

A frequency mapping region varies with N.sub.ID.sup. cell ID which is unique for each cell. Hence, cells having adjacent cell IDs may reduce interference caused by transmission of a PCFICH. This N.sub.ID.sup.cell is comprised of 504 values ranging from 0 to 503 according to a current 3GPP LTE standard. When N.sub.RB.sup.DL is an odd number, a region in which frequency mapping for PCFICH transmission can not be performed occurs according to N.sub.ID.sup.cell.

FIG. 2 illustrates the case where a region in which mapping can not be implemented occurs in a frequency region for PCFICH transmission according to N.sub.ID.sup. cell. For example, if N.sub.RB.sup.DL is 25, N.sub.ID.sup. cell is 12, and M.sub.sc.sup.RB is 12, a frequency region allocated to 4 successive resource elements deviates from a frequency region in which a PCFICH should actually be transmitted. In this case, the PCFICH can not be allocated to a corresponding region.

DISCLOSURE

Technical

An object of the present invention devised to solve the problem lies in providing a method which can solve a problem of wasting resource elements or having difficulty in mapping while mapping symbols for a PCFICH.

Technical Solution

The object of the present invention can be achieved by providing a method of mapping symbols of a PCFICH in units of a resource element group. If the number of resource blocks transmitted in downlink is an even number, a conventional mapping method is used. If the number of resource blocks is an odd number, the method of mapping symbols of a PCFICH is used including determining a start position of a resource element to map the symbols for the PCFICH using a variable obtained by subtracting 1 from the number of resource blocks, and mapping the symbols in the start position.

The determining may include determining an initial start position according to a physical layer cell ID.

The mapping may include mapping symbols of a first group among four groups to resource elements starting with a position of K=K.sub.0, mapping symbols of a second group among the four groups to resource elements starting with a position of K=K.sub.0+.left brkt-bot.(N.sub. RB.sup.DL-1)N.sub.sc.sup.RB/4.right brkt-bot., mapping symbols of a third group among the four groups to resource elements starting with a position of k=k.sub.0+.left brkt-bot.2(N.sub.RB.sup.DL-1)N.sub.sc.sup.RB/4.right brkt-bot., and mapping symbols of a fourth group among the four groups to resource elements starting with a position of k=k.sub.0+.left brkt-bot.3(N.sub.RB.sup.DL-1)N.sub.sc.sup.RB/4.right brkt-bot.

The mapping may include mapping symbols in positions except for resource elements of reference signals in a first OFDM symbol.

In another aspect of the present invention, provided herein is a method of mapping symbols of a PCFICH, including determining a start position of a resource element to map the symbols for the PCFICH by flooring a value, obtained by multiplying the number of resource blocks by a variable proportional to a symbol index for the PCFICH and then dividing the multiplied result by 2, wherein the resource blocks are transmitted in downlink, and mapping the symbols in the start position.

The determining may include determining an initial start position according to a physical layer cell ID.

The mapping may include mapping symbols of a first group among four groups to resource elements starting with a position of k=k.sub.0, mapping symbols of a second group among the four groups to resource elements starting with a position of k=k.sub.0+.left brkt-bot.N.sub.RB.sup.DL/2.right brkt-bot.N.sub.sc.sup.RB/2; mapping symbols of a third group among the four groups to resource elements starting with a position of k=k.sub.0+.left brkt-bot.2N.sub.RB.sup.DL/2.right brkt-bot.N.sub.sc.sup.RB/2, and mapping symbols of a fourth group among the four groups to resource elements starting with a position of k=k.sub.0+.left brkt-bot.3N.sub.RB.sup.DL/2.right brkt-bot.N.sub.sc.sup.RB/2.

The mapping may include mapping symbols of a first group among four groups to resource elements starting with a position of k=k.sub.0, mapping symbols of a second group among the four groups to resource elements starting with a position of k=k.sub.0.left brkt-bot.N.sub.RB.sup.DL/2.right brkt-bot.N.sub.sc.sup.RB/2, mapping symbols of a third group among the four groups to resource elements starting with a position of k=k.sub.0+2.left brkt-bot.N.sub. RB.sup.DL/2.right brkt-bot.N.sub.sc.sup.RB/2, and mapping symbols of a fourth group among the four groups to resource elements starting with a position of k=k.sub.0+ 3.left brkt-bot.N.sub.RB.sup.DL/2.right brkt-bot.N.sub. sc.sup.RB/2.

The mapping may include mapping symbols in positions except for resource elements of reference signals in a first OFDM symbol.

Advantageous Effects

In accordance with the exemplary embodiments of the present invention, a problem of wasting resource elements or not being able to implement mapping can be solved by applying a simple mapping rule while mapping symbols of a PCFICH.

DESCRIPTION OF DRAWINGS

The accompanying drawings, which are included to provide a further understanding of the invention, illustrate embodiments of the invention and together with the description serve to explain the principle of the invention.

In the drawings

BEST MODE

Reference will now be made in detail to the exemplary embodiments of the present invention with reference to the accompanying drawings. The detailed description is intended to explain exemplary embodiments of the present invention, rather than to show the only embodiments that can be implemented according to the invention.

In an exemplary embodiment of the present invention, a method applying different mapping rules according to N.sub.RB.sup.DL is proposed.

In a conventional mapping method, the above-described problems do not occur for N.sub.RB.sup.DL of an even number, so the conventional mapping method is used for N.sub.RB.sup.DL of an even number and the following mapping method is used for N.sub.RB.sup.DL of an odd number.

Hereinbelow, y(0), . . . , y(15) denotes 16 QPSK symbols, N.sub.RB.sup.DL denotes the number of resource blocks transmitted in downlink, and N.sub.sc.sup.RB denotes the number of resource elements per resource block.

According to an exemplary embodiment of the present invention, if N.sub.RB.sup.DL is an odd number, y(0), . . . , y(3) are mapped to resource elements starting with a position of k=k.sub.0, y(4), . . . , y(7) are mapped to resource elements starting with a position of k=k.sub.0+.left brkt-bot.(N.sub.RB.sup.DL-1)N.sub.sc.sup.RB/4.right brkt-bot., y(8), . . . , y(11) are mapped to resource elements starting with a position of k=k.sub.0+.left brkt-bot.2N.sub.RB.sup.DLN.sub.sc.sup.RB/4.right brkt-bot. or k=k.sub.0+.left brkt-bot.2(N.sub.RB.sup.DL-1)N.sub.sc.sup.RB/4.right brkt-bot., and y(12), . . . , y(15) are mapped to resource elements starting with a position of k=k.sub.0+.left brkt-bot.3(N.sub.RB.sup.DL-1)N.sub.sc.sup.RB/4.right brkt-bot.

Figure 1:
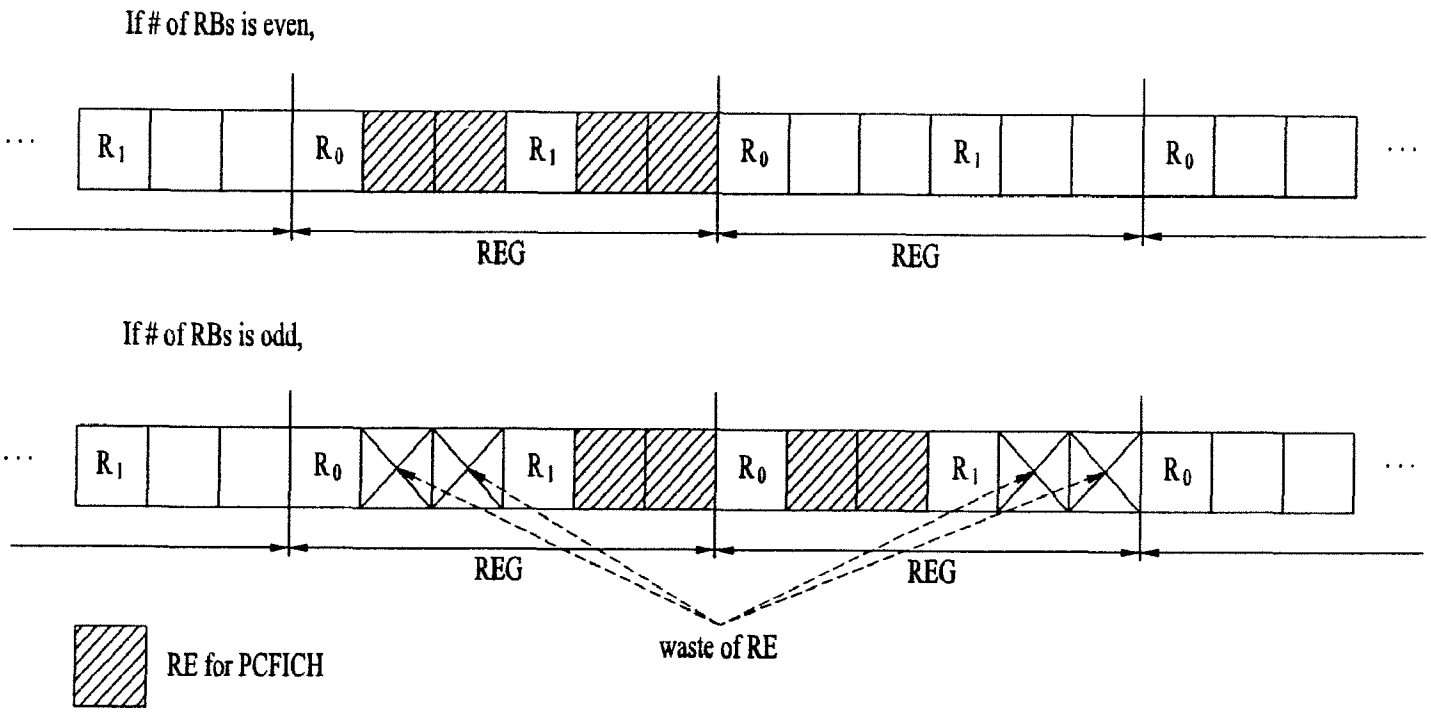
FIG. 1 illustrates a conventional mapping method in which 4 symbols are mapped to 2 REGs.
Figure 2:
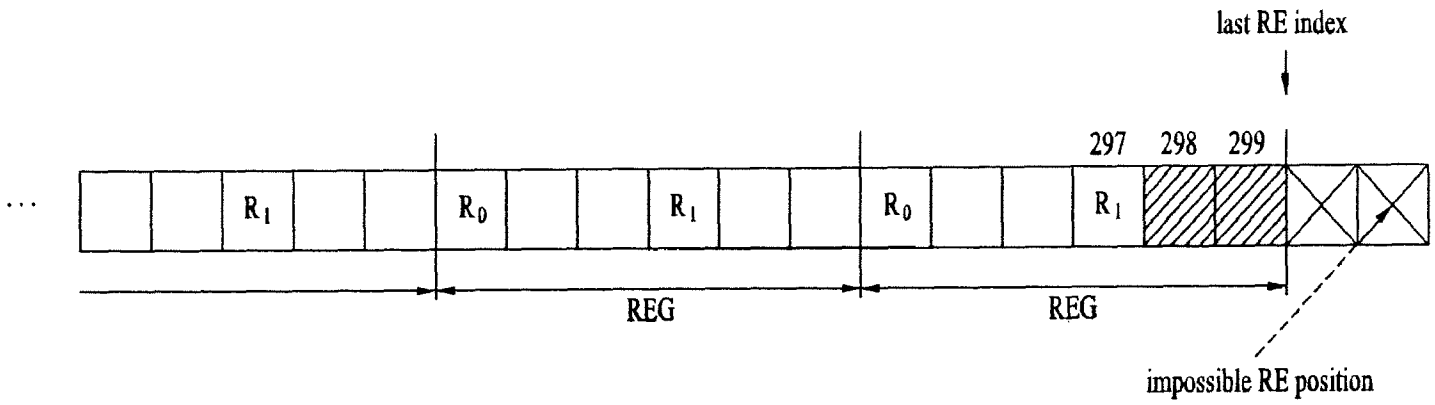
FIG. 2 illustrates the case where mapping can not be implemented in a conventional mapping method.
Figure 3:
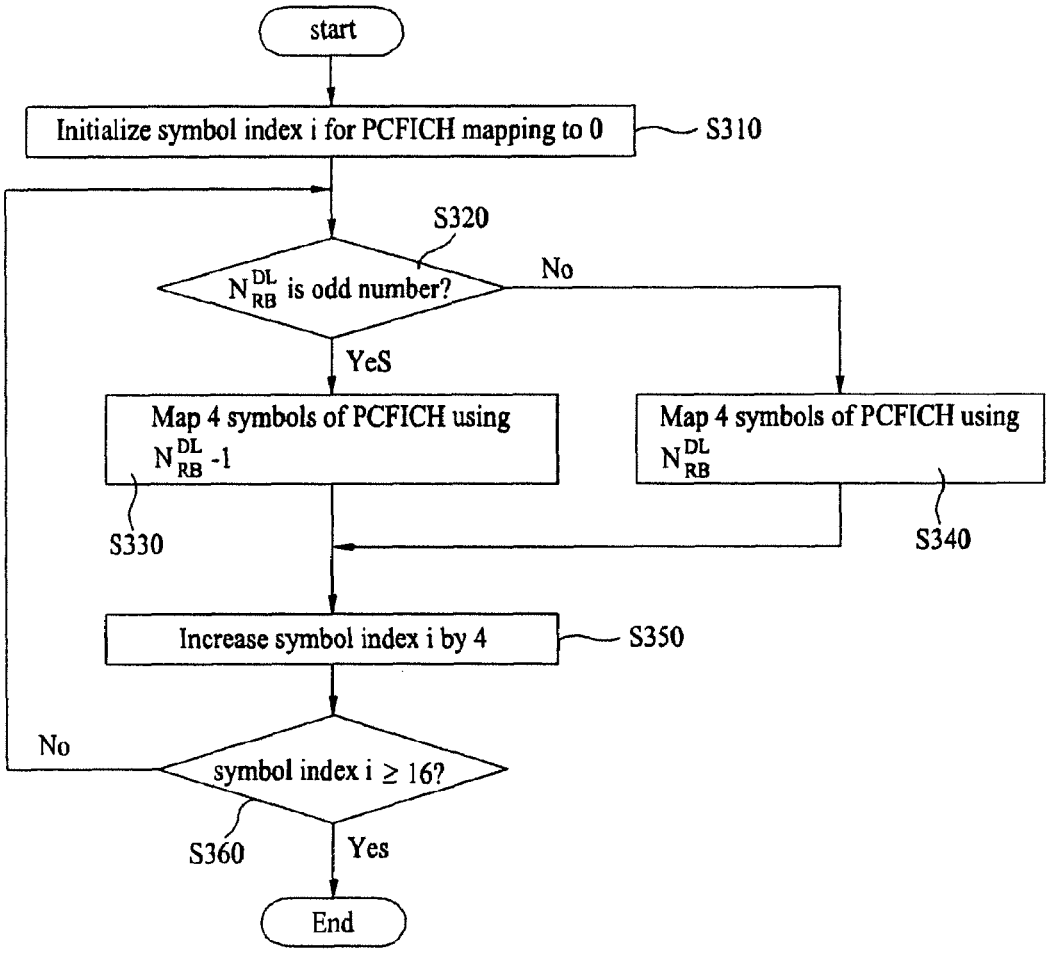
FIG. 3 is a flow chart illustrating a PCFICH mapping method according to an exemplary embodiment of the present invention; mapping method.

FIG. 3 is a flow chart illustrating a PCFICH mapping method according to an exemplary embodiment of the present invention.

A symbol index i for PCFICH mapping is initialized to 0 (step S310).

Next, a determination is made as to whether N.sub.RB.sup.DL is an odd number (step S320). If N.sub.RB.sup.DL is an odd number, positions of resource elements to map 4 symbols of a PCFICH are determined using N.sub.RB.sup.DL-1 and the 4 symbols are mapped to corresponding positions (step S330).

If N.sub.RB.sup.DL is an even number, positions of resource elements to map 4 symbols of a PCFICH are determined using N.sub.RB.sup.DL and the 4 symbols are mapped to corresponding positions (step S340).

If mapping is completed, the symbol index i is increased by 4 (step S350).

If the symbol index i is less than 16 (step S360), the above operations (steps S320 to S350) are repeated since symbols to be mapped remain.

Finally, if the symbol index i is equal to or greater than 16 (S360), a procedure is ended.

Meanwhile, another exemplary embodiment of the present invention proposes a single mapping method irrespective of whether N.sub.RB.sup.DL is an odd number or an even number.

That is, the following mapping rule using a single expression regardless of N.sub.RB.sup.DL can solve the conventional problems in mapping symbols for a PCFICH.

According to another exemplary embodiment of the present invention, y(0), . . . , y(3) are mapped to resource elements starting with a position of k=k.sub.0, y(4), . . . , y(7) are mapped to resource elements starting with a position of k=k.sub.0+.left brkt-bot.N.sub.RB.sup.DL/2.right brkt-bot.N.sub.sc.sup.RB/2, y(8), . . . , y(11) are mapped to resource elements starting with a position of k=k.sub.0+.left brkt-bot.2N.sub.RB.sup.DL/2.right brkt-bot.N.sub.sc.sup.RB/2, and y(12), . . . , y(15) are mapped to resource elements starting with a position of k=k.sub.0+3N.sub.RB.sup.DL/2.right brkt-bot.N.sub.sc.sup.RB/2.

In the above method, k.sub.0 is determined according to N.sub.ID.sup.cell. If an index indicated by k.sub.0 collides with an index of a resource element using a reference signal, k.sub.0 may use an index increased by '1'.

Figure 4:
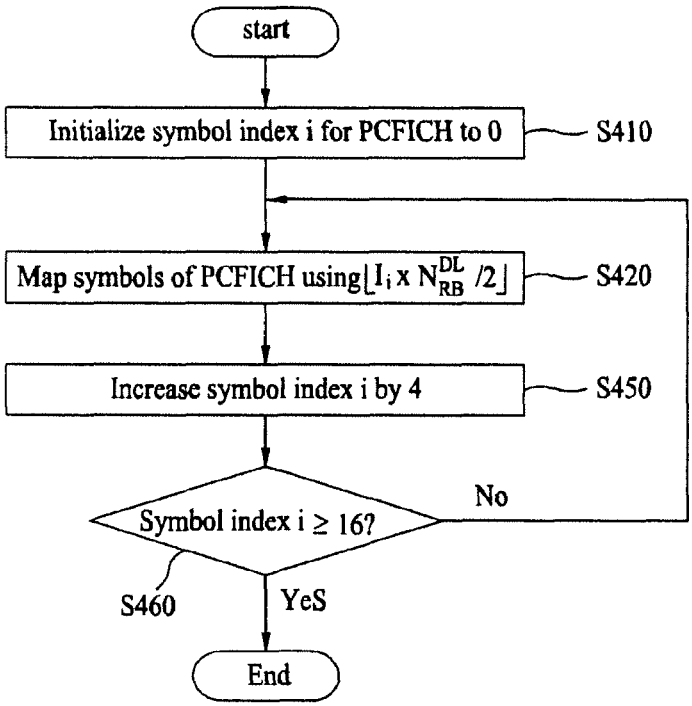
FIG. 4 is a flow chart illustrating a PCFICH mapping method according to another exemplary embodiment of the present invention; mapping method.

FIG. 4 is a flow chart illustrating a PCFICH mapping method according to another exemplary embodiment of the present invention.

First, a symbol index i for PCFICH mapping is initialized to 0 (step S410).

A start position of a resource element for PCFICH mapping is determined by flooring a value obtained by multiplying a variable I.sub.i proportional to the symbol index by N.sub.RB.sup.DL and then dividing the multiplied result by 2 (step S420). The variable may be, for example, I.sub.0=0, I.sub.4=1, I.sub.8=2, and I.sub.12=3.

If mapping is completed, the symbol index i is increased by 4 (step S450).

If the symbol index i is less than 16 (step S460), the above operations (steps S420 to 5450) are repeated since symbols to be mapped remain.

Finally, if the symbol index i is equal to or greater than 16 (S460), a procedure is ended.

The above mapping rule according to another exemplary embodiment of the present invention may be modified as follows.

Namely, y(0), . . . , y(3) are mapped to resource elements starting with a position of k=k.sub.0, y(4), . . . , y(7) are mapped to resource elements starting with a position of k=k.sub.0+3.left brkt-bot.N.sub.RB.sup.DL/2.right brkt-bot.N.sub.sc.sup.RB/2, y(8), . . . , y(11) are mapped to resource elements starting with a position of k=k.sub.0+2.left brkt-bot.N.sub.RB.sup.DL/2.right brkt-bot.N.sub.sc.sup.RB/2, and (12), . . . , y(15) are mapped to resource elements starting with a position of k=k.sub.0+3.left brkt-bot.N.sub.RB.sup.DL/2.right brkt-bot.N.sub.sc.sup.RB/2.

Figure 5:
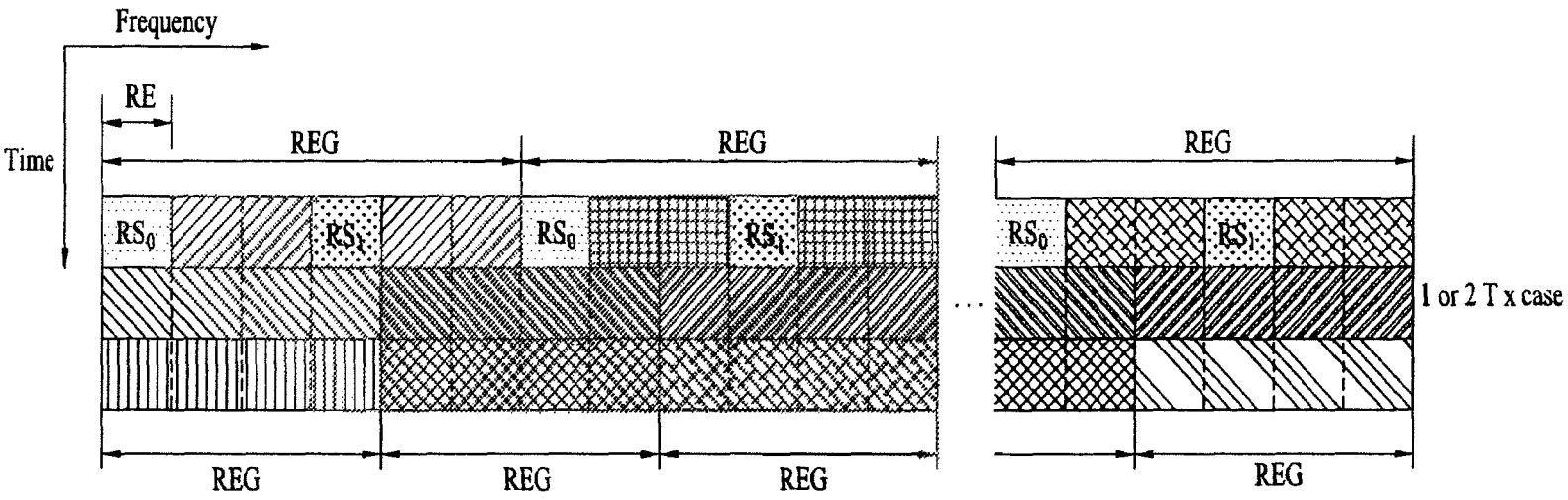
FIG. 5 illustrates an example of REGs when 2 or less transmit antennas are used; mapping method.

FIG. 5 illustrates an example of REGs when two or less transmit antennas are used.

In the first OFDM symbol (first line) through which a PCFICH is transmitted, since reference signals of respective antennas are transmitted, one REG is comprised of 6 resource elements. Since no reference signal exists in the second OFDM symbol (second line) when using 2 or less transmit antennas, one REG is comprised of 4 resource elements.

Figure 6:
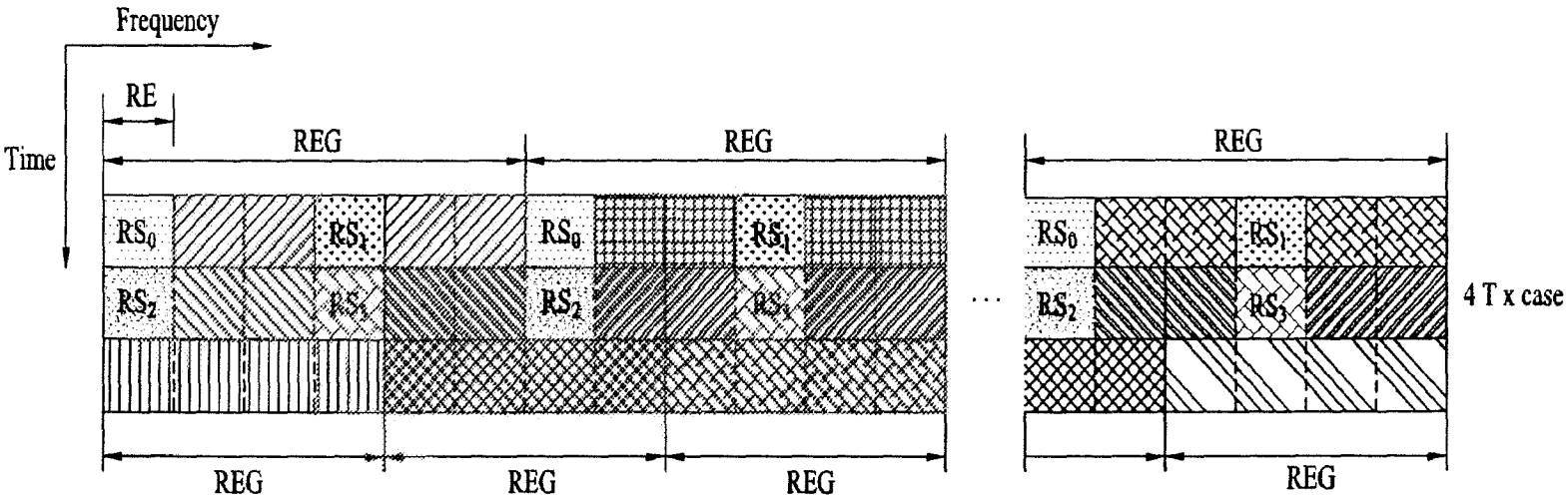
FIG. 6 illustrates an example of REGs when 4 transmit antennas are used; and mapping method.

FIG. 6 illustrates an example of REGs when 4 transmit antennas are used.

In the first OFDM symbol (first line) through which a PCFICH is transmitted, since reference signals of antennas are transmitted, one REG is comprised of 6 resource elements. When using 4 transmit antennas, since reference signals exist even in the second OFDM symbol (second line), one REG is comprised of 6 resource elements.

Figure 7:
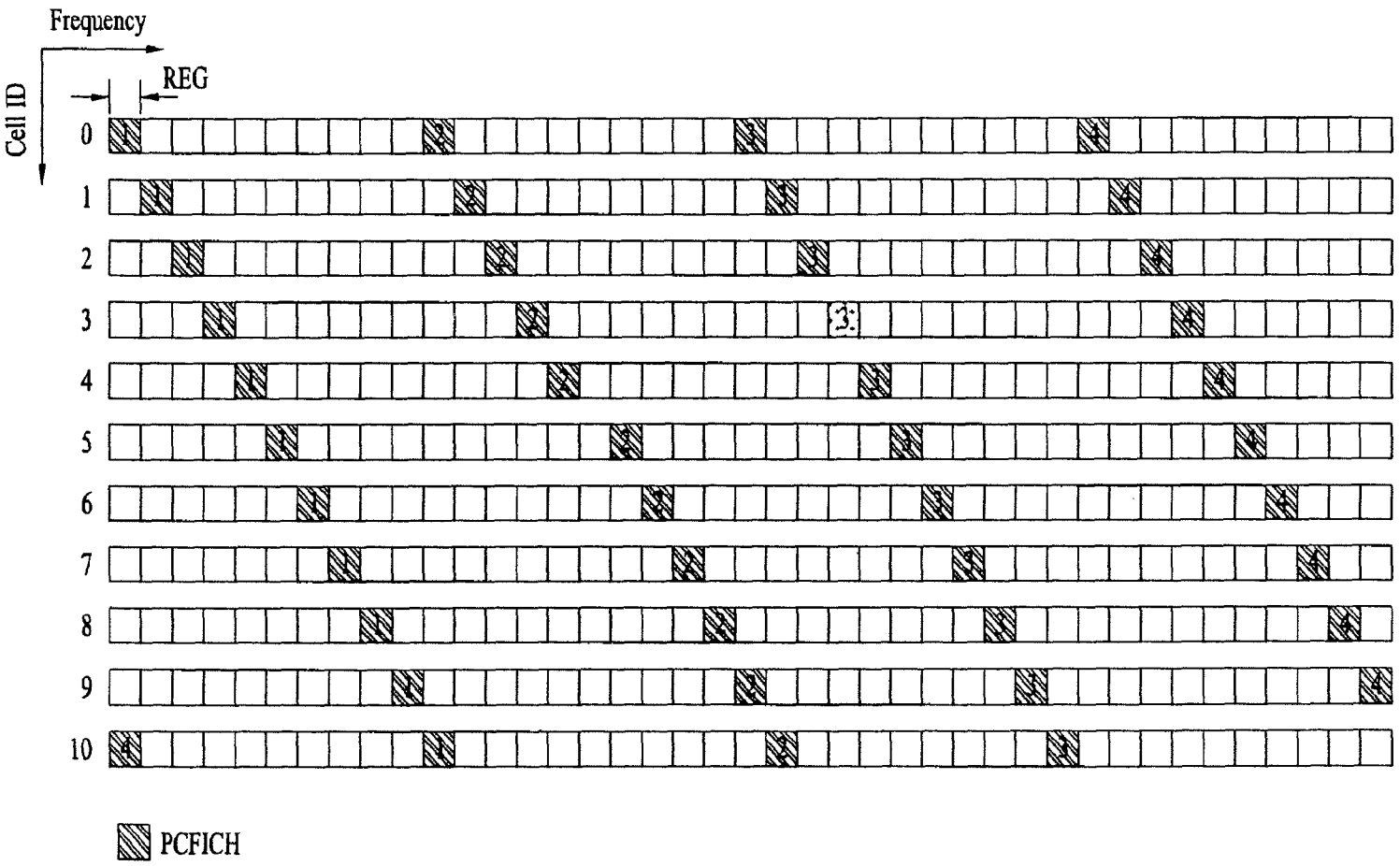
FIG. 7 illustrates an example of PCFICH mapping according to a cell ID.

FIG. 7 illustrates an example of PCFICH mapping according to a cell ID.

In FIG. 7, a system band corresponds to 20 resource blocks. Different start positions are set for 10 cell IDs.

Positions denoted by "1" indicate positions of k.sub.0 in the above-described mapping method. Accordingly, interference between cell IDs is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a mapping method for frequency and OFDM symbol regions of a signal transmitted in downlink in a cellular OFDM wireless packet communication system and is applicable to a base station, a user equipment, etc. in a 3GPP LTE system.

What is claimed is:

[1. A base station in a wireless communication system, the base station comprising:

means for mapping 16 physical control format indicator channel (PCFICH) symbols to four resource element groups (REGs) in a first orthogonal frequency division multiplexing (OFDM) symbol of a downlink subframe; and means for transmitting the mapped 16 PCFICH symbols to a user equipment (UE), wherein the four REGs comprises a first REG including first four resource elements (REs), a second REG including second four REs, a third REG including third four REs s and a fourth REG including fourth four REs, wherein first REs from the first four REs, the second four REs, the third four REs and the fourth four REs have positions given by:

$K_0$, $K_0+\lfloor N_{RB}^{DL}/2\rfloor*N_{SC}^{RB}/2$, $K_0+\lfloor 2N_{RB}^{DL}/2\rfloor*N_{SC}^{RB}/2$, and $K_0+\lfloor 3N_{RB}^{DL}/2\rfloor*N_{SC}^{RB}/2$, respectively, wherein $K_0$ is determined as $(N_{SC}^{RB}/2)*(N_{ID}^{cell} \bmod 2N_{RB}^{DL})$, wherein $N_{RB}^{DL}$ indicates a number of resource blocks (RBs) transmitted in a downlink, wherein $N_{SC}^{RB}$ indicates a number of REs per a RB in the frequency domain, and wherein $N_{ID}^{cell}$ is a physical layer cell identifier.]

[2. The base station of claim 1, wherein the $N_{SC}^{RB}$ is 12.]

[3. The base station of claim 1, further comprising:

means for transmitting reference signals to the UE, wherein each of the first REG, the second REG, the third REG and the four REG has 6 contiguous REs in the first OFDM symbol of the downlink subframe, and 2 of the 6 contiguous REs are used for the reference signals.]

[4. The base station of claim 1, wherein the 16 PCFICH symbols notify the UE of whether 1, 2 or 3 OFDM symbols in the downlink subframe are used for transmitting a control channel.]

[5. A user equipment in a wireless communication system, the user equipment comprising:

means for receiving 16 physical control format indicator channel (PCFICH) symbols via a first orthogonal frequency division multiplexing (OFDM) symbol of a downlink subframe from a base station, wherein the 16 PCFICH symbols are mapped to four resource element groups (REGs), wherein the four REGs comprises a first REG including first four resource elements (REs), a second REG including second four REs, a third REG including third four REs and a fourth REG including fourth four REs, wherein first REs from the first four REs, the second four REs, the third four REs and the fourth four REs have positions given by:

$K_0$, $K_0+\lfloor N_{RB}^{DL}/2\rfloor*N_{SC}^{RB}/2$, $K_0+\lfloor 2N_{RB}^{DL}/2\rfloor*N_{SC}^{RB}/2$, and $K_0+\lfloor 3N_{RB}^{DL}/2\rfloor*N_{SC}^{RB}/2$, respectively, wherein $K_0$ is determined as $(N_{SC}^{RB}/2)*(N_{ID}^{cell} \bmod 2N_{RB}^{DL})$, wherein $N_{RB}^{DL}$ indicates a number of resource blocks (RBs) transmitted in a downlink, wherein $N_{SC}^{RB}$ indicates a number of REs per a RB in the frequency domain, and wherein $N_{ID}^{cell}$ is a physical layer cell identifier.]

[6. The user equipment of claim 5, wherein the $N_{SC}^{RB}$ is 12.]

[7. The user equipment of claim 5, further comprising:

means for receiving reference signals from the base station, wherein each of the first REG, the second REG, the third REG and the four REG has 6 contiguous REs in the first OFDM symbol of the downlink subframe, and 2 of the 6 contiguous REs are used for the reference signals.]

[8. The user equipment of claim 5, further comprising:

means for acquiring information about a number of OFDM symbols used for a control channel based on the received 16 PCFICH symbols.]

*9. A method of mapping a physical control format indicator channel (PCFICH) transmitted to a user equipment (UE), the method comprising:*

*mapping the PCFICH to four resource element regions in a first orthogonal frequency division multiplexing (OFDM) symbol in a downlink subframe,*

*wherein each of the four resource element regions includes four adjacent resource elements which are not used for transmitting a reference signal,*

*wherein indexes of starting resource elements corresponding to the four resource element regions are given by:*

$K_0$, $K_0+\lfloor N_{RB}^{DL}/2\rfloor*N_{SC}^{RB}/2$, $K_0+\lfloor 2N_{RB}^{DL}/2\rfloor*N_{SC}^{RB}/2$, *and*

$K_0+\lfloor 3N_{RB}^{DL}/2\rfloor*N_{SC}^{RB}/2$, *respectively,*

*wherein the additions are modulo* $N_{RB}^{DL}N_{SC}^{RB}$,

*wherein* $K_0$ *is determined as* $(N_{SC}^{RB}/2)*(N_{ID}^{cell} \bmod 2N_{RB}^{DL})$,

*wherein* $N_{RB}^{DL}$ *indicates a number of resource blocks (RBs) transmitted in a downlink,*

*wherein* $N_{SC}^{RB}$ *is 12, and*

*wherein* $N_{ID}^{cell}$ *is a physical layer cell identifier.*

*10. The method of claim 9, wherein each of the four resource element regions corresponds to each of four resource element groups including 6 contiguous resource elements, and the 6 contiguous resource elements include 2 resource elements used for the reference signal.*

*11. The method of claim 9, wherein, when a starting resource element of* $K_0$ *collides with a resource element used for transmitting the reference signal,* $K_0$ *is determined as* $(N_{SC}^{RB}/2)*(N_{ID}^{cell} \bmod 2N_{RB}^{DL})+1$.

*12. The method of claim 9, wherein the PCFICH notifies the UE of a number of symbols in the downlink used for transmitting a control channel.*

*13. A method of receiving a physical control format indicator channel (PCFICH) by a user equipment (UE), the method comprising:*

*receiving the PCFICH in a first orthogonal frequency division multiplexing (OFDM) symbol in a downlink subframe,*

*wherein the PCFICH is mapped to four resource element regions in the first OFDM symbol of the downlink subframe,*

*wherein each of the four resource element regions includes four adjacent resource elements which are not used for transmitting a reference signal,*

*wherein indexes of starting resource elements corresponding to the four resource element regions are given by:*

$K_0$, $K_0+\lfloor N_{RB}^{DL}/2\rfloor*N_{SC}^{RB}/2$, $K_0+\lfloor 2N_{RB}^{DL}/2\rfloor*N_{SC}^{RB}/2$, *and*

$K_0+\lfloor 3N_{RB}^{DL}/2\rfloor*N_{SC}^{RB}/2$, *respectively,*

*wherein the additions are modulo* $N_{RB}^{DL}N_{SC}^{RB}$,

*wherein* $K_0$ *is determined as* $(N_{SC}^{RB}/2)*(N_{ID}^{cell} \bmod 2N_{RB}^{DL})$,

*wherein* $N_{RB}^{DL}$ *indicates a number of resource blocks (RBs) transmitted in a downlink,*

*wherein* $N_{SC}^{RB}$ *indicates a number of resource elements (REs) per RB in a frequency domain, and*

*wherein* $N_{ID}^{cell}$ *is a physical layer cell identifier.*

*14. The method of claim 13, wherein each of the four resource element regions corresponds to each of four resource element groups including 6 contiguous resource elements, and the 6 contiguous resource elements include 2 resource elements used for the reference signal.*

*15. The method of claim 13, wherein, when a starting resource element of* $K_0$ *collides with a resource element used for transmitting the reference signal,* $K_0$ *is determined as* $(N_{SC}^{RB}/2)*(N_{ID}^{cell} \bmod 2N_{RB}^{DL})+1$.

*16. The method of claim 13, wherein the PCFICH notifies the UE of a number of symbols in the downlink used for transmitting a control channel.*

* * * * *